(No Model.) 2 Sheets—Sheet 2.
C. ROTZIEN & P. ARNOLD.
STOCK LOADER.
No. 515,794. Patented Mar. 6, 1894.
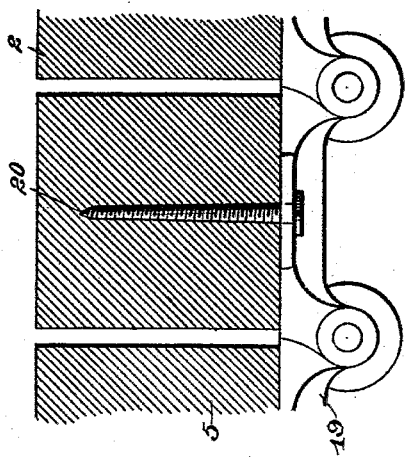
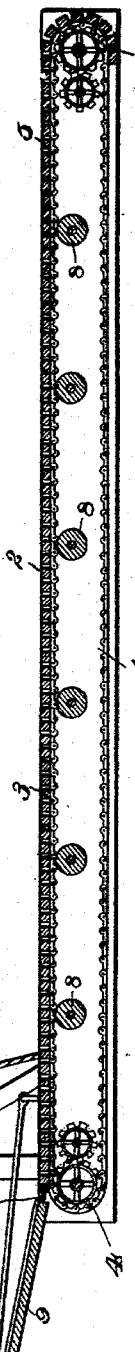
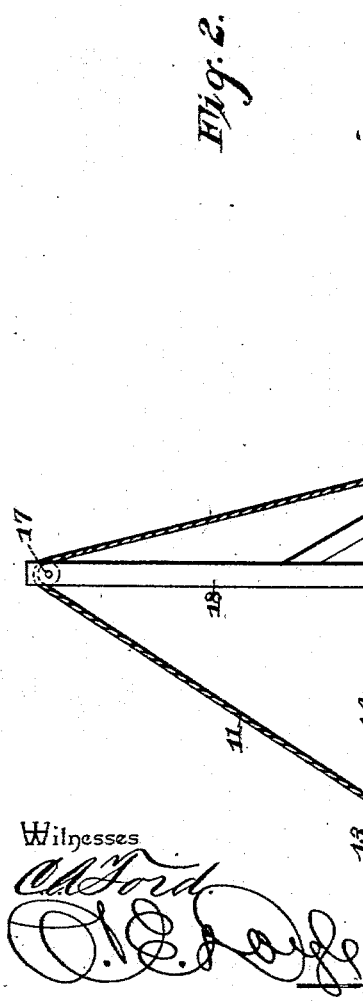
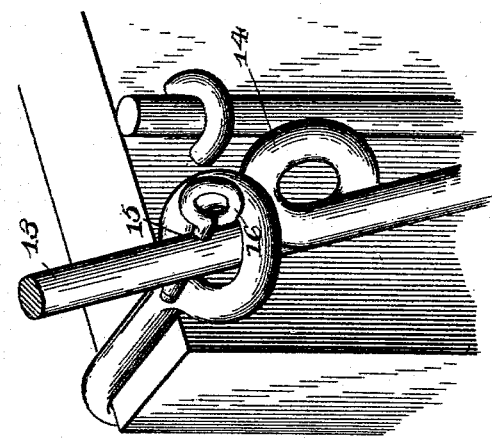
Witnesses
C. A. Ford.
O. E. Duff.
Inventors
Christopher Rotzien,
Philip Arnold,
By their Attorneys.
C. A. Snow & Co.
THE NATIONAL LITHOGRAPHING COMPANY,
WASHINGTON, D. C.

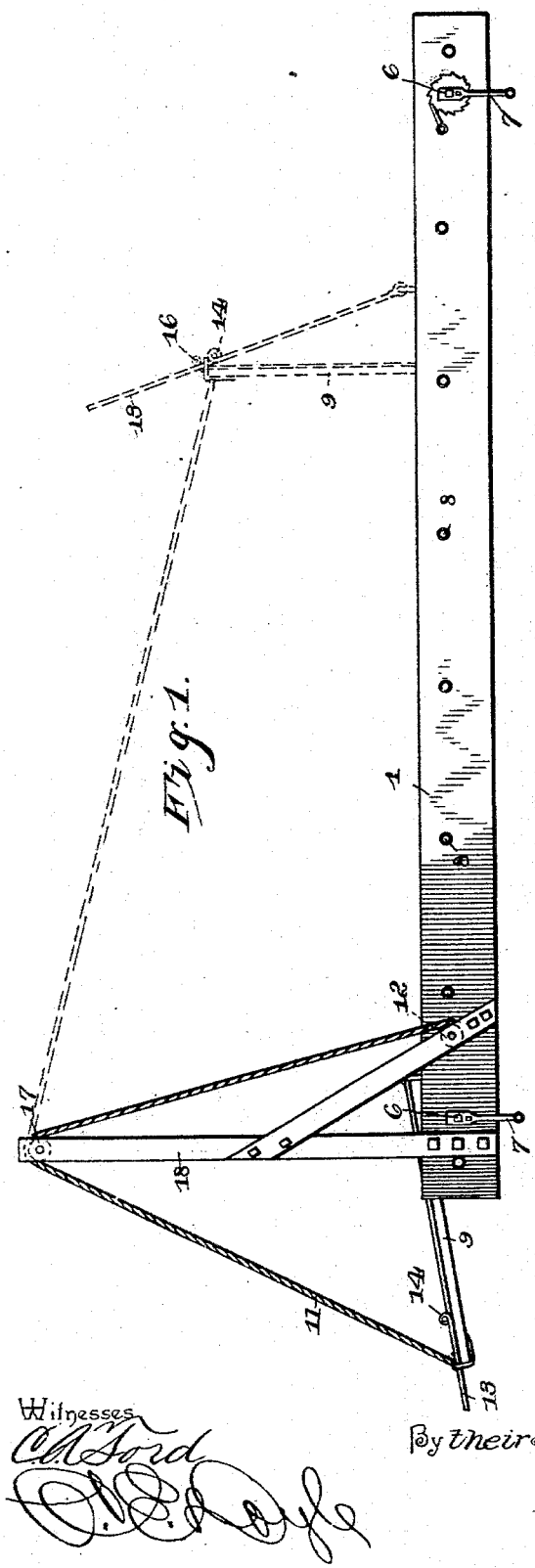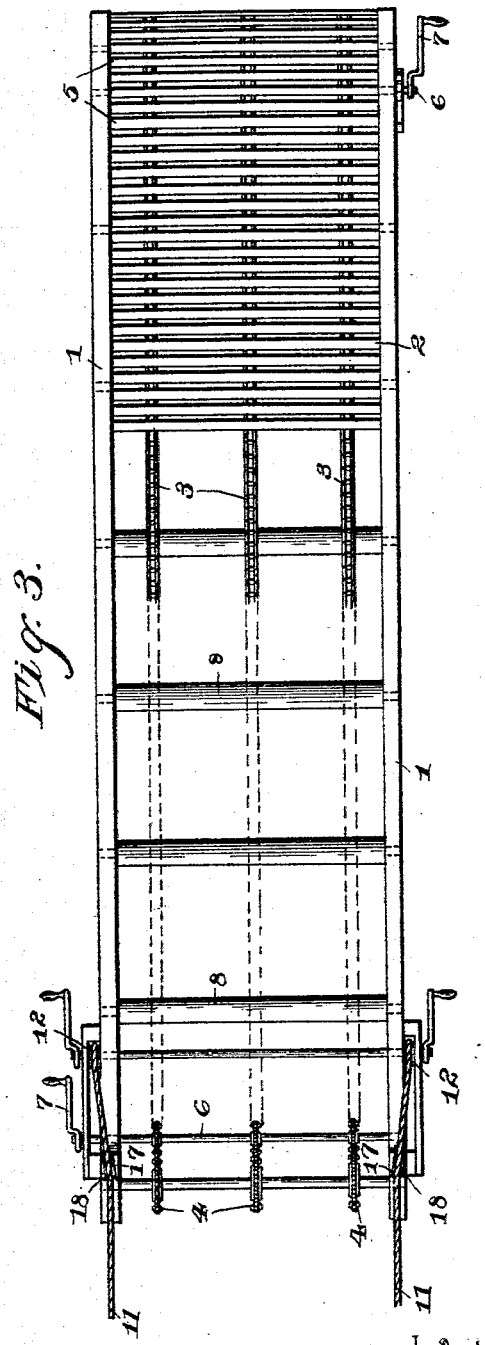

UNITED STATES PATENT OFFICE.

CHRISTOPHER ROTZIEN AND PHILIP ARNOLD, OF BEEVILLE, TEXAS.

STOCK-LOADER.

SPECIFICATION forming part of Letters Patent No. 515,794, dated March 6, 1894.

Application filed June 5, 1893. Serial No. 476,650. (No model.)

*To all whom it may concern:*

Be it known that we, CHRISTOPHER ROTZIEN and PHILIP ARNOLD, citizens of the United States, residing at Beeville, in the county of Bee and State of Texas, have invented a new and useful Improvement in Stock-Loaders, of which the following is a specification.

Our invention relates to improvements in stock loaders, for loading stock, &c., upon cars, and the object of the invention is to provide a simple and efficient device whereby the harsh treatment necessary to force cattle over a gangway or bridge may be avoided.

In carrying out our invention we employ a loader having a movable floor or platform which, by means of suitable mechanism, is moved toward the car, thus carrying the stock thereinto whether they face in the direction of movement or not, and without effort upon their part.

In the drawings we have illustrated a preferred form of our invention, which, however, is susceptible of various changes in the matter of form, proportion, and the minor details of construction within the skill of the mechanic and without departing from the spirit of the invention.

The nature of our improvements is fully described hereinafter in connection with the accompanying drawings, and the novel features thereof are particularly pointed out in the appended claims.

In the drawings: Figure 1 is a side view of a loader embodying the invention. Fig. 2 is a longitudinal central section of the same. Fig. 3 is a plan view thereof. Fig. 4 is a detail view showing the gate and gate-rod connections. Fig. 5 is a detail sectional view to show the manner of connecting the floor slats to the chain.

Similar numerals of reference indicate corresponding parts in all the figures of the drawings.

1 designates the framework, which is preferably rectangular in plan, and 2 is an endless floor which is arranged within the framework and comprises the chains 3, which move around terminally-located sprocket or chain wheels 4, and transversely-disposed slats 5, which are secured to and carried by said chains. Geared to the sprocket or chain wheels, at opposite ends of the framework, are operating shafts 6, provided with cranks or handles 7. Supplemental or idle rollers 8 are arranged at intervals between the sides of the framework to support the upper side of the endless floor or platform in a horizontal position when loaded.

9 represents a gate which is pivotally connected at its lower edge to one end of the slats of the floor or platform, as shown at 10, and is adapted to stand in a vertical position, as shown in dotted lines in Fig. 1 and in full lines in Fig. 2, or assume a horizontal or inclined position as shown in full lines in Fig. 1. We employ a rope or chain 11, and a winch 12, mounted in the side bars of the framework to move the gate from one position to another; it is adapted to rest at its free end upon the ground when in the lowered position; and when elevated it is held in place by means of a gate-rod 13, provided with a stop 14, formed by an eye in the rod or in any other suitable manner, and perforated, as at 15, to receive a locking-pin 16, to hold the gate in contact with the said stop, all of which is shown clearly in Fig. 4. The rope or chain 11 passes over guide-pulleys 17, which are supported above the framework by means of the uprights or standards 18.

The slats forming the floor of the device are secured respectively to the links 19 of the chains by means of screws 20, or similar fasteners.

This being the construction of our invention, the operation thereof is as follows: The stock are driven up the short incline formed by the gate in its lowered position until a sufficient number stand upon the floor or platform of the loader, when said gate is elevated by means of the winch and connections and is locked by the means described in a vertical position. The floor or platform is now moved forward by means of the operating mechanism provided for this purpose, until the stock reach the car door and are deposited. It will be seen that the stock are carried forward, or in the desired direction, whether they face in the direction of movement or not; and hence all harsh treatment, usually necessary to force them to move in the intended direction, is avoided. After the elevation of the gate all chance of escape is cut off, and the movement of the floor or platform can be made sufficiently slow to avoid frightening the stock.

Various other advantages connected with our invention will occur to and be appreciated by stock dealers, stock raisers, &c., such as the avoidance of permanent injury to the stock, thus rendering them unfit for market.

Having thus described our invention, what we claim, and desire to secure by Letters Patent, is—

1. In a stock loader, the combination with a framework, of an endless floor or platform, operating devices therefor, and a gate pivotally connected to the floor or platform and adapted to be lowered to form a gangway, substantially as specified.

2. In a stock loader, the combination with a framework, of an endless floor or platform, operating mechanism therefor, a gate pivotally connected to the floor or platform, locking devices to hold the gate in an upright position, and elevating devices therefor, substantially as specified.

3. In a stock loader, the combination with a framework, of an endless floor or platform, operating mechanism therefor, a gate pivotally connected to the floor of the platform and provided with an eye, elevating devices connected to the gate, a locking-rod connected to the platform, fitting in said eye and provided with a stop and a locking-pin to fit in a suitable perforation at an interval from said stop to hold the gate in an upright position, substantially as specified.

4. In a stock loader, the combination with a framework, of an endless floor or platform, operating devices therefor, and a gate pivotally connected to the floor or platform and adapted to be lowered to form a gangway, elevating mechanism for the gate, and locking means carried by the platform to hold the gate in an upright position, substantially as specified.

In testimony that we claim the foregoing as our own we have hereto affixed our signatures in the presence of two witnesses.

CHRISTOPHER ROTZIEN.
PHILIP ARNOLD.

Witnesses:
FRANK DUDEK,
R. C. EEDS.